US011774750B2

(12) United States Patent
Sadakane et al.

(10) Patent No.: US 11,774,750 B2
(45) Date of Patent: Oct. 3, 2023

(54) LAMINATED GLASS (71) Applicant: AGC Inc., Chiyoda-ku (JP)

(72) Inventors: Shunsuke Sadakane, Tokyo (JP); Tokihiko Aoki, Tokyo (JP)

(73) Assignee: AGC Inc., Tokyo (JP)

( * ) Notice: Subject to any disclaimer, the term of this patent is extended or adjusted under 35 U.S.C. 154(b) by 337 days.

(21) Appl. No.: 16/671,351

(22) Filed: Nov. 1, 2019

(65) Prior Publication Data
US 2020/0064626 A1 Feb. 27, 2020

Related U.S. Application Data (63) Continuation of application No. PCT/JP2018/018968, filed on May 16, 2018.

(30) Foreign Application Priority Data

May 23, 2017 (JP) .................................. 2017-102139

(51) Int. Cl.
*B32B 17/10* (2006.01)
*G02B 27/00* (2006.01)
(Continued)

(52) U.S. Cl.
CPC .... *G02B 27/0018* (2013.01); *B32B 17/10082* (2013.01); *B32B 17/10559* (2013.01);
(Continued)

(58) Field of Classification Search
CPC .. B32B 3/26; B32B 3/263; B32B 3/30; B32B 17/06; B32B 17/064; B32B 17/10165;
(Continued)

(56) References Cited

U.S. PATENT DOCUMENTS 8,451,541 B2 5/2013 Labrot et al.
9,915,822 B2 3/2018 Arndt et al.
(Continued)

FOREIGN PATENT DOCUMENTS

EP    3176015 A1 * 6/2017 ....... B32B 17/10036
JP    2002104018 A    4/2002
(Continued)

OTHER PUBLICATIONS

Submission of Publications issued Aug. 9, 2022 in Japanese Patent Application No. 2019-519600 (with English translation), 30 pages.
(Continued)

*Primary Examiner* — Z. Jim Yang
(74) *Attorney, Agent, or Firm* — Element IP, PLC (57) ABSTRACT

A laminated glass includes first and second glass plates arranged on vehicle interior and exterior sides, respectively; and an intermediate film located between the glass plates, and configured to be bonded to the glass plates. The laminated glass has a display area used for a head-up display. The display area includes an area having a cross section with a wedge shape. A thickness of an upper edge side portion of the display area is greater than that of a lower edge side. In at least a part of the area having a cross section with a wedge shape, a value of the wedge angle varies depending on a position of measurement in the vertical direction. A viewing angle of the display area is 2 degrees or more. A maximum amount of deviation in measured values of the wedge angles from a linear approximation line is 0.2 mrad or less.

20 Claims, 4 Drawing Sheets

(51) Int. Cl.
*G02B 27/01* (2006.01)
*B60J 1/00* (2006.01)

(52) U.S. Cl.
CPC ......... *B32B 17/10568* (2013.01); *B60J 1/001* (2013.01); *G02B 27/0101* (2013.01); *B32B 2307/40* (2013.01)

(58) Field of Classification Search
CPC .......... B32B 17/1055; B32B 17/10559; B32B 17/10761; B32B 17/10568; B32B 17/10577; B32B 17/10587; B32B 27/06; B32B 27/30; B32B 27/306; B32B 17/10–1099; G02B 27/0018; G02B 27/0101; Y10T 428/24058; Y10T 428/24355; Y10T 428/24364; Y10T 428/24405; Y10T 428/24479; Y10T 428/24504; Y10T 428/24521; Y10T 428/24529; Y10T 428/24537; Y10T 428/2457; Y10T 428/24612; Y10T 428/2462; Y10T 428/24942; Y10T 428/2495; Y10T 428/24959; B60J 1/001; B60J 1/002; B60J 1/02
USPC ....... 428/105, 112, 141, 142, 147, 156, 159, 428/161, 162, 163, 167, 172, 173, 212, 428/213, 214
See application file for complete search history.

(56) References Cited

U.S. PATENT DOCUMENTS

| | | | | |
|---|---|---|---|---|
| 2010/0314900 | A1* | 12/2010 | Labrot | G02B 27/0101 156/99 |
| 2011/0189426 | A1* | 8/2011 | Durbin | B32B 17/10568 428/80 |
| 2013/0149503 | A1* | 6/2013 | Yamamoto | B32B 17/10036 428/156 |
| 2015/0251377 | A1* | 9/2015 | Cleary | B32B 17/10 428/172 |
| 2016/0168353 | A1* | 6/2016 | Spangler | B32B 17/10761 428/172 |
| 2017/0003503 | A1* | 1/2017 | Arndt | B32B 17/10036 |
| 2017/0072663 | A1* | 3/2017 | Sadakane | G02B 27/0101 |
| 2017/0285339 | A1* | 10/2017 | Spangler | B32B 37/182 |
| 2017/0313032 | A1* | 11/2017 | Arndt | B32B 17/10137 |
| 2018/0017789 | A1* | 1/2018 | Aoki | B32B 17/10743 |
| 2018/0149865 | A1* | 5/2018 | Arndt | G02B 27/0101 |
| 2020/0016871 | A1* | 1/2020 | Ishida | B32B 17/10761 |
| 2020/0016872 | A1* | 1/2020 | Oota | B60J 1/02 |
| 2020/0018954 | A1* | 1/2020 | Ogawa | B32B 17/10036 |
| 2020/0369006 | A1* | 11/2020 | Nishino | B32B 27/08 |
| 2021/0114353 | A1* | 4/2021 | Oota | B60J 1/02 |

FOREIGN PATENT DOCUMENTS

| | | | |
|---|---|---|---|
| JP | 2005219583 | A | 8/2005 |
| JP | 2011-505330 | A | 2/2011 |
| JP | 2017-502125 | A | 1/2017 |
| JP | 2017502124 | A | 1/2017 |
| JP | 2017512175 | A | 5/2017 |
| JP | 2018505831 | A | 3/2018 |
| JP | 2018520043 | A | 7/2018 |
| WO | WO-2016017566 | A1 | 2/2016 |
| WO | WO-2016091435 | A1 | 6/2016 |
| WO | WO-2016198679 | A1 * | 12/2016 ....... B32B 17/10036 |
| WO | WO 2017/090561 | A1 | 6/2017 |

OTHER PUBLICATIONS

Submission of Publications issued Feb. 28, 2023 in Japanese Patent Application No. 2019-519600 (with English translation), 14 pages.

* cited by examiner

LAMINATED GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2018/018968 filed on May 16, 2018 and designating the U.S., which claims priority of Japanese Patent Application No. 2017-102139 filed on May 23, 2017. The entire contents of the foregoing applications are incorporated herein by reference.

BACKGROUND OF THE INVENTION

1. Field of the Invention

The disclosure herein generally relates to a laminated glass.

2. Description of the Related Art

In recent years, head-up displays (in the following, referred to as "HUD"), in which images are reflected on windshields (front glasses) of vehicles so that pieces of predetermined information are displayed in drivers' views, have been introduced. However, for drivers viewing of views outside the vehicles or of pieces of the information displayed by the HUD, there may be cases where double images are problems.

Double images that are problematic for drivers of vehicles include transmitted double images and reflected double images. The windshields include HUD display areas used for the HUD and non-HUD display areas (transparent areas) that are not used for the HUD. In the HUD display areas, although transmitted double images may be problems in the HUD display areas, typically reflected double images are the main problems. In the non-HUD display areas, transmitted double images are problems.

It has been known that occurrence of such reflected double images or transmitted double images can be reduced by using, for windshields, laminated glasses having cross sections that have wedge shapes, viewed from the horizontal direction. For example, laminated glasses holding with two glass plates intermediate films having cross sections that have a wedge shape, in which wedge angles vary depending on places in the windshields have been proposed (See, for example, Japanese Translation of PCT International Application Publication No. JP 2017-502125).

SUMMARY OF THE INVENTION

Technical Problem

In the related art, because the HUD display areas have been relatively narrow, even when errors (amounts of deviation) in the wedge angles of the intermediate films from target values are great, reflected double images were seldom observed.

However, when the HUD display area becomes wider in order to display more information (e.g. to project larger images on the windshield), even small variations in the shapes of the windshields may affect the projected images. That is, the occurrence of reflected double images due to great amounts of deviations in the wedge angles of the intermediate films from the target values cannot be prevented.

The present invention was made in view of such a problem, and it is an object of the present invention to provide a laminated glass having a non-constant wedge angle, in which the occurrence of a reflected double image is prevented even if the HUD display area is wider than the related art.

Solution to Problem

According to an aspect of the present invention, a laminated glass includes a first glass plate arranged on a vehicle interior side; a second glass plate arranged on a vehicle exterior side; and an intermediate film located between the first glass plate and the second glass plate, and configured to be bonded to the first glass plate and to the second glass plate. The laminated glass further includes a display area used for a head-up display. The display area includes an area having a cross section with a wedge shape. A thickness of an upper edge side portion of the display area in a vertical direction is greater than a thickness of a lower edge side portion of the display area. In at least a part of a region of the area having a cross section with a wedge shape, a value of the wedge angle varies depending on a position of measurement in the vertical direction. A viewing angle of the display area in the vertical direction is 2 degrees or more. A maximum amount of deviation in measured values of the wedge angles from a linear approximation line obtained by approximating the measured values of the wedge angles at respective positions of measurement in the display area in the vertical direction by a linear function is 0.2 mrad or less.

Advantageous Effect of Invention

According to an aspect of the present invention, a laminated glass having a non-constant wedge angle, in which the occurrence of a reflected double image is prevented even if the HUD display area is wider than the related art, is provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, with reference to the drawings, embodiments of the present invention will be described. In each drawing, the same reference numeral is assigned to the same component, and redundant explanation will be omitted. In the following, a windshield of a vehicle will be described as an example, but the present invention is not limited to this, and the laminated glass according to the embodiment can also be applied to a glass in addition to the windshield of the vehicle.

[Reflected Double Image, Transmitted Double Image]

Figure 1A:
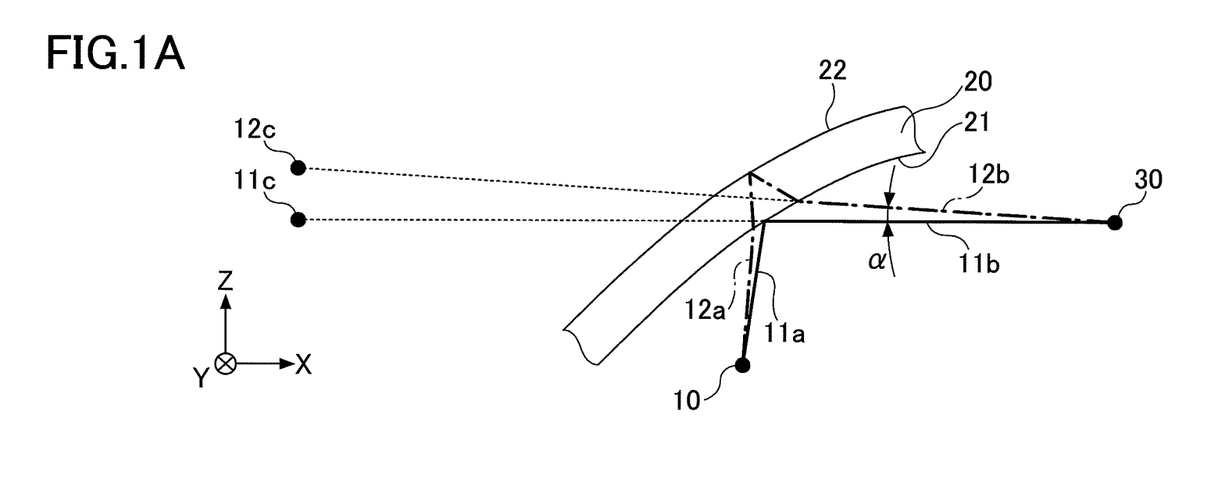
FIGS. 1A and 1B are diagrams for explaining concepts of double images in the related art.
Figure 1B:
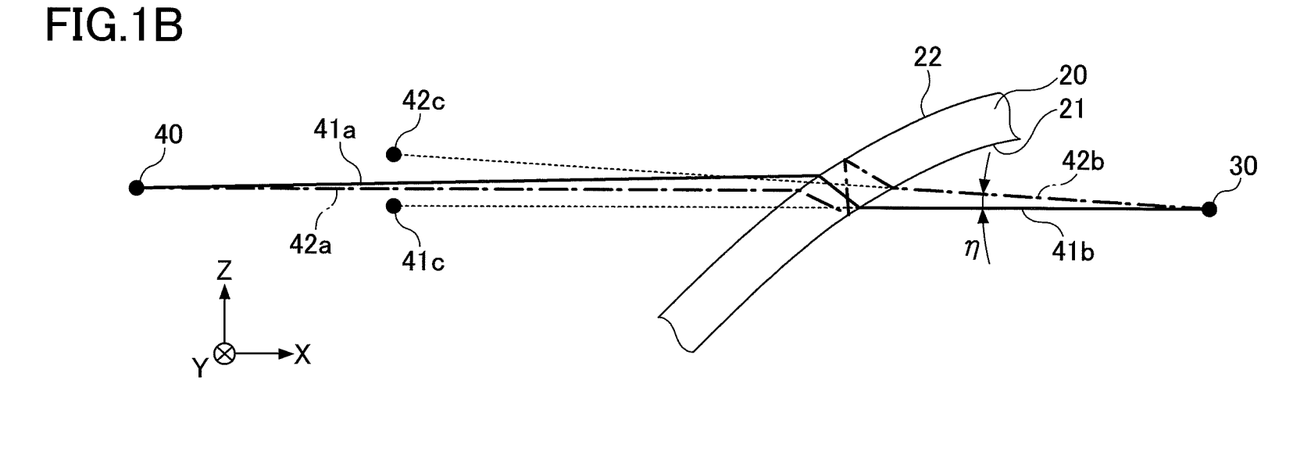

First, concepts of a reflected double image and a transmitted double image will be described. FIGS. 1A and 1B are diagrams for explaining concepts of double images. FIG. 1A illustrates a reflected double image, and FIG. 1B illustrates a transmitted double image. In FIGS. 1A and 1B, a front-back direction of a vehicle to which the windshield 20 is mounted is referred to as an X-direction, a left-right direction of the vehicle is referred to as a Y-direction, and a direction perpendicular to an XY-plane is referred to as a Z-direction. The same applies to subsequent drawings.

As illustrated in FIG. 1A, a part of a light beam 11a emitted from a light source 10 of a HUD is reflected on an interior surface 21 of the windshield 20 of the vehicle, and guided to eyes 30 of a driver, as a light beam 11b (primary beam). Thus, the driver visually recognizes an image 11c (virtual image) in front of the windshield 20.

Moreover, a part of a light beam 12a emitted from the light source 10 of the HUD enters an interior of the windshield 20 from the interior surface 21 of the windshield 20 of the vehicle, and is refracted. A part thereof is reflected on an exterior surface 22. Furthermore, the part thereof emerges from the interior surface 21 to the outside of the windshield 20 of the vehicle by refraction, and guided to the eyes 30 of the driver as a light beam 12b (secondary beam). Thus, the driver visually recognizes an image 12c (virtual image).

In this way, the driver visually recognizes the two images 11c and 12c as reflected double images. Moreover, the angle between the light beam 11b (primary beam) and the light beam 12b (secondary beam) is referred to as an angle α of the reflected double image. The angle α of the reflected double image is preferably small. In the present application, when the secondary beam is above the primary beam viewed from the driver, the reflected image is defined to have a positive value.

Moreover, as illustrated in FIG. 1B, a part of a light beam 41a emitted from a light source 40 outside the vehicle enters the interior of the windshield 20 from the exterior surface 22 of the windshield 20 of the vehicle and is refracted. Then, a part thereof emerges to the outside of the windshield 20 from the interior surface 21 and is refracted, and guided to the eyes 30 of the driver as a light beam 41b. Thus, the driver visually recognizes an image 41c.

Moreover, a part of a light beam 42a emitted from the light source 40 outside the vehicle enters the interior of the windshield 20 from the exterior surface 22 of the windshield 20 of the vehicle and is refracted. A part thereof is reflected on the interior surface 21. Furthermore, the part thereof that is reflected on the exterior surface 22, may emerge to the outside of the windshield 20 from the interior surface 21 and is refracted, and guided to the eyes 30 of the driver as a light beam 42b. Thus, the driver visually recognizes an image 42c.

In this way, the driver visually recognizes the two images 41c and 42c as transmitted double images. Moreover, the angle between the light beam 41b (primary beam) and the light beam 42b (secondary beam) is referred to as an angle η of the transmitted double image. The angle η of the transmitted double image is preferably small.

[Windshield (Laminated Glass)]

Figure 2A:
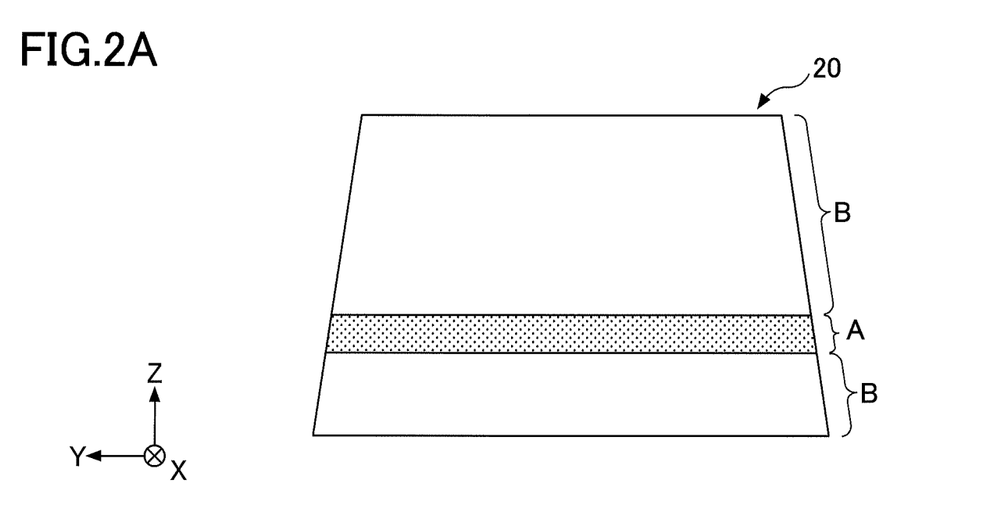
FIGS. 2A and 2B are diagrams for explaining a windshield for a vehicle.
Figure 2B:
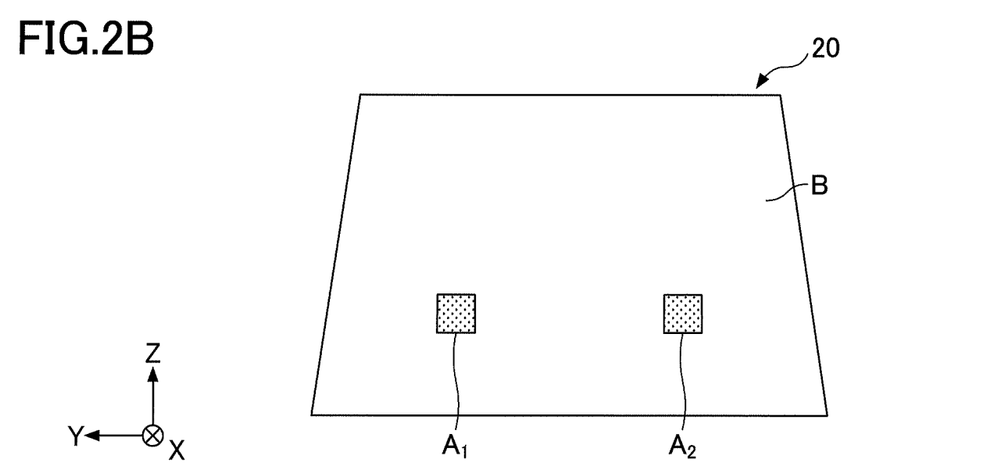

FIGS. 2A and 2B are diagrams depicting a windshield of a vehicle, and schematically depicting the windshield 20 viewed from a vehicle interior to a vehicle exterior. Note that in FIGS. 2A and 2B, as a matter of convenience, a HUD display area is indicated by a dotted pattern.

As illustrated in FIG. 2A, the windshield 20 includes a HUD display area A used for the HUD, and a non-HUD display area B (transparent area) that is not used for the HUD. The HUD display area A is set to be a region on the windshield 20, which is irradiated with a light from a mirror configuring the HUD viewed from a V1 point defined in JIS R3212, when the mirror is rotated.

The HUD display area A is located below the windshield 20, and the non-HUD display area B is located around the HUD display area A on the windshield 20 and adjacent to the HUD display area A. For example, the HUD display area may be divided into a plurality of parts and arranged at a plurality of positions arrayed in the Y-direction, such as a HUD display area $A_1$ and a HUD display area $A_2$, shown in FIG. 2B. Alternatively, the HUD display area may be only either one of the HUD display area $A_1$ and the HUD display area $A_2$. Furthermore, the HUD display area may be divided into a plurality of parts and arranged at a plurality of positions arrayed in the Z-direction (not shown). The HUD display areas A, $A_1$, and $A_2$ are typical examples of an area used for the head-up display according to the present application. In the specification of the present application, a HUD display area indicates a region on the windshield 20 in which a HUD image, viewed from an area that is assumed to be a viewpoint position of a driver while driving for any rotational position of a concave mirror, is reflected.

Figure 3:
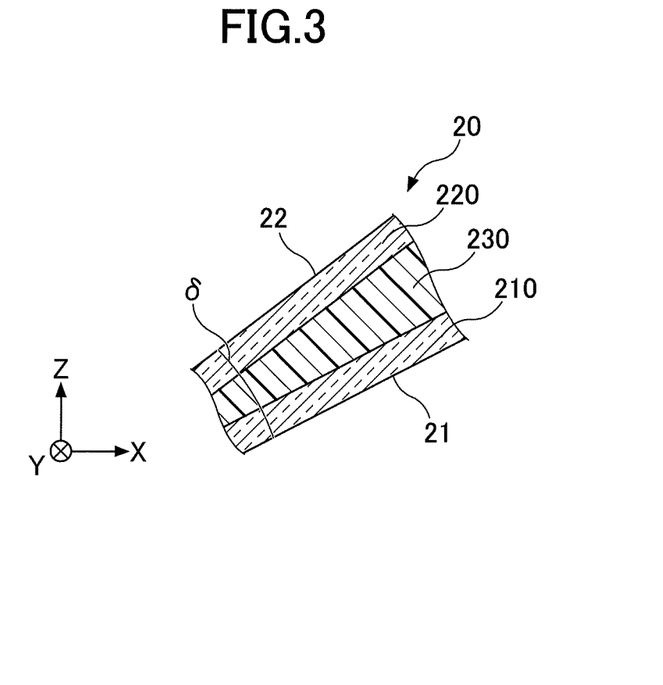
FIG. 3 is a partial cross-sectional view depicting the windshield 20 illustrated in FIGS. 2A and 2B, cut along an XZ-plane, and viewed from the Y-direction.

FIG. 3 is a partial cross-sectional view depicting the windshield 20 illustrated in FIGS. 2A and 2B, cut along the XZ-plane. As illustrated in FIG. 3, the windshield 20 is a laminated glass provided with a glass plate 210 that is a first glass plate, a glass plate 220 that is a second glass plate, and an intermediate film 230. In the windshield 20, the glass plate 210 and the glass plate 220 are fixed to each other via the intermediate film 230.

In the windshield 20 that is a laminated glass, the glass plates 210 and 220 have lines generated by drawing upon manufacturing, respectively. The intermediate film 230 is located between the glass plate 210 and the glass plate 220. The intermediate film 230 is a film that fixes the glass plate 210 and the glass plate 220 to each other so that the lines of the glass plate 210 are orthogonal to the lines of the glass plate 220, for example.

An interior surface 21 of the windshield 20 that is one surface of the glass plate 210 (vehicle interior side) and an exterior surface 22 of the windshield 20 that is one surface of the glass plate 220 (vehicle exterior side) may be flat surfaces or may be curved surfaces.

The HUD display area A is formed so as to have a cross-section with a wedge shape, in which a thickness varies from a lower edge side toward an upper edge side of the windshield 20, when the windshield 20 is mounted to the vehicle, and a wedge angle is denoted by δ. In at least a part of the area of the windshield 20 which has a cross section with a wedge shape, the wedge angle varies depending on the position in the vertical direction. The area of the windshield 20, which has a cross section with a wedge shape, includes a region in which the wedge angle varies.

The above-described wedge angle δ is an average variation rate of a plate thickness of the windshield 20 obtained by using the least squares method from 13 pieces of data, which are present within a range of 30 mm in front of and behind a certain point, of plate thicknesses of the windshield 20 measured at an interval of 5 mm in the vertical direction when the windshield 20 is mounted to the vehicle. Moreover, a "slope" of the wedge angle is an average variation rate of the wedge angles by using the least squares method within the same range.

In the windshield 20, the wedge angles of the respective regions are formed by making at least the intermediate film 230 be a wedge film. In addition to this, any one of or both the glass plate 210 and the glass plate 220 may be formed in a wedge shape.

In order to form one or both of the glass plate 210 and the glass plate 220 to have a wedge shape, a condition upon manufacturing by using the float method is required to be controlled. When circumferential velocities of a plurality of rolls arranged on both ends in a width direction of a glass ribbon that moves on a melted metal are controlled, a cross section of a glass in the width direction may be a concave shape, a convex shape, or a tapered shape. Then, a part with a desired thickness change may be cut out.

The glass plates 210 and 220 include streak-shaped fine irregularities (lines) parallel with respect to the moving direction, by an extension upon manufacturing using the float method, respectively. Upon using as a windshield for a vehicle, when the lines are viewed in the horizontal direction with respect to a line of sight of an observer, a distortion occurs and a visibility degrades.

For the glass plates 210 and 220, an inorganic glass such as a soda lime glass, or an alumino-silicate glass; an organic glass; or the like may be used. A plate thickness of the glass plate 220 located on the outside of the windshield 20 is preferably 1.8 mm or more and 3 mm or less. When the plate thickness of the glass plate 220 is less than 1.8 mm, a resistance to flying stones is poor. When the plate thickness is greater than 3 mm, the glass plates become heavy and are difficult to be shaped.

The plate thickness of the glass plate 210 located on the inside of the windshield 20 is preferably 0.3 mm or more and 2.3 mm or less. When the plate thickness of the glass plate 210 is less than 0.3 mm, the glass plate becomes difficult to be handled. When the plate thickness is greater than 2.3 mm, it becomes difficult for the glass plate 210 to follow a shape of the intermediate film 230 that is a wedge film. The plate thickness of the glass plate 210 is more preferably 2.0 mm or less, further preferably 1.8 mm or less, and especially preferably 1.6 m or less. However, the respective plate thicknesses of the glass plates 210 and 220 are not necessarily constant, but may vary depending on positions, as necessary.

The windshield 20 may have a curved shape or also may not have a curved shape. In the case where the windshield 20 has a curved shape, when two sheets of glass that are especially deeply curved are shaped for the glass plates 210 and 220, a difference in shape between two sheets (mismatch) occurs, and will greatly affect the glass quality (e.g. residual stress) after pressure bonding.

When the variable wedge angle is applied to the windshield 20 to limit the plate thickness of the glass plate 210 to greater than or equal to 0.3 mm and less than or equal to 2.3 mm, the glass quality (e.g. residual stress) is maintained. When the plate thickness of the glass plate 210 is greater than or equal to 0.3 mm and less than or equal to 2.3 mm, the glass quality of the glass that is deeply curved (e.g. residual stress) is maintained especially effectively.

In order to obtain the windshield 20 with a curved shape, the glass plates 210 and 220 are shaped by the float method, and afterwards bent and formed before bonding via the intermediate film 230. The bending and forming are performed while the glass is heated and softened. The heating temperature for the glass upon bending and forming is about 550° C. to 700° C.

Figure 4:
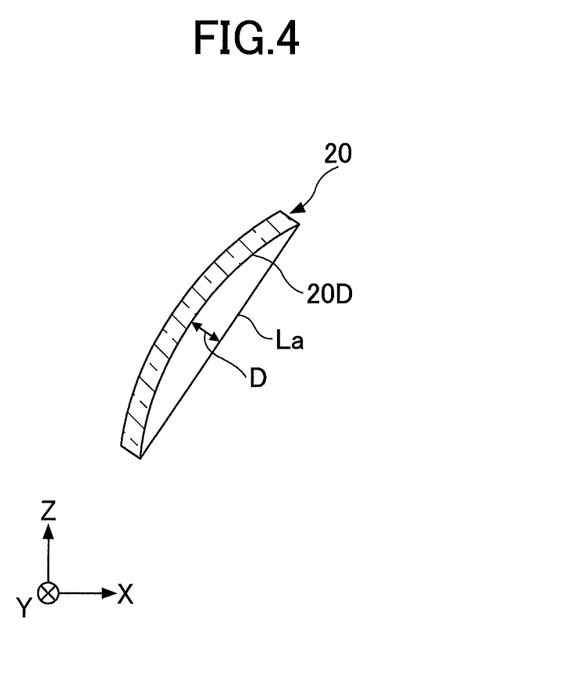
FIG. 4 is a cross-sectional view depicting the windshield 20 illustrated in FIGS. 2A and 2B, cut along an XZ-plane, and viewed from the Y-direction.

FIG. 4 is a cross-sectional view depicting the windshield 20 illustrated in FIGS. 2A and 2B, cut along the XZ-direction and viewed from the Y-direction. As illustrated in FIG. 4, in the case where the windshield 20 has a curved shape, a distance from a line La that connects the midpoints of the opposite sides of the concave face 20D of the windshield 20, among the longer of the two pairs of opposite sides, to the deepest portion of the concave face 20D, in a direction orthogonal to the line La, will be referred to as a maximum depth of curvature D of the windshield 20.

When the maximum depth of curvature D of the windshield 20 is 10 mm or more, the lines can be sufficiently extended by bending and forming, and the visibility can be sufficiently enhanced. The maximum depth of curvature D is preferably 12 mm or more, and more preferably 15 mm or more. Moreover, the radius of curvature of the concave face 20D is preferably greater than 6000 mm. When the radius of curvature of the concave face 20D is greater than 6000 mm, the HUD image is less likely to be distorted. The radius of curvature of the concave face 20D is more preferably 7000 mm or more, and further preferably 8000 mm or more.

Respective colors of the glass plates 210 and 220 are not particularly limited, as long as a transmission of a visible light (Tv) is greater than 70%.

Moreover, in a peripheral portion of the windshield 20, a shielding layer referred to as a so-called "black ceramic" is preferably present. The shielding layer is formed by applying a black ceramic ink for printing on a glass surface and baking the same. According to the shielding layer, a black obscure layer is formed in the peripheral portion of the windshield 20. According to the black obscure layer, the degradation of a resin such as a urethane for holding the windshield 20 in the peripheral portion by ultraviolet light can be prevented.

Moreover, a coat having a water-repellant function, an infrared light shielding function, an ultraviolet light shielding function, or a visible light reflectance reduction function, or a coat having low radiation characteristics may be arranged outside the windshield 20 (external surface of the glass plate 220) or inside (internal surface of the glass plate 210).

Returning back to the description of FIG. 3, as the intermediate film 230 for bonding the glass plate 210 and the glass plate 220, a thermoplastic resin is often used, including, a thermoplastic resin that has been used conventionally for this kind of purpose, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin.

Among the above-described resins, a plasticized polyvinyl acetal resin is preferably used, because of its excellence in balance of properties, such as transparency, weather resistance, strength, bond strength, resistance to penetration, absorbability for impact energy, humidity resistance, thermal insulating property, and sound insulating property. The thermoplastic resin may be used independently, or two kinds or more resins may be used concurrently. The term "plasticized" in the plasticized polyvinyl acetal resin means that the resin is plasticized by adding a plasticizing agent. The same applies to the other plasticized resins.

The polyvinyl acetal resin includes a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. In particular, a PVB is preferable, because of its excellence in balance of properties, such as transparency, weather resistance, strength, bond strength, resistance to penetration, absorbability for impact energy, humidity resistance, thermal insulating property, and sound insulating property. The polyvinyl acetal resin may be used independently, or two kinds or more resins may be used concurrently. A material forming the intermediate film 230 is not limited to a thermoplastic resin.

The thickness of the intermediate film 230 is preferably 0.5 mm or more even at the thinnest portion. When the thickness of the intermediate film 230 is less than 0.5 mm, a resistance to penetration that is required for a windshield is not secured. Moreover, the thickness of the intermediate film 230 is preferably 3 mm or less even at the thickest portion. When the thickness of the intermediate film 230 is greater than 3 mm, a weight becomes greater, and a handleability becomes worse.

The intermediate film 230 may be provided with a region having a sound insulation function, an infrared light shielding function, an ultraviolet light shielding function, a shade band (function of reducing a visible light transmittance), or the like. Moreover, the intermediate film 230 may include three or more layers. For example, by configuring the intermediate film 230 with three layers, and making the hardness of the central layer less than hardness of both adjacent layers, the sound insulation function is enhanced. In this case, hardness of both the layers may be the same or may be different from each other.

In this way, as the number of layers of the intermediate film 230 increases, the thicknesses of the respective layers vary, and for example, an optical quality such as the transparent double image which is described above may be further degraded. In this case, by limiting the plate thickness of the glass plate 210 to greater than or equal to 0.3 mm and less than or equal to 2.3 mm, the glass plate 210 becomes easy to follow the wedge film of the intermediate film 230, and thereby the degradation of the optical quality is prevented. That is, limiting the plate thickness of the glass plate 210 to greater than or equal to 0.3 mm and less than or equal to 2.3 mm is especially effective when the number of layers of the intermediate film 230 increases.

Normally, a light source for the HUD is located in a lower part of the vehicle interior, and projects an image toward the laminated glass. Because the projected image is reflected on the rear surface and the front surface of the glass plates 210 and 220, in order to overlay both the reflected images so as not to generate a double image, the thickness of the glass is required to vary in parallel with respect to the projection direction. When the thickness of the glass plate 210 varies in a direction orthogonal to the lines, in order to project information on the glass plate 210, the direction of the lines is orthogonal to the projection direction, i.e. the lines are in a horizontal direction with respect to a line of sight of an observer inside the vehicle interior (driver), and it is required to use in a direction in which the visibility degrades.

In order to improve the visibility, the laminated glass prepared using the glass plate 210, the glass plate 220, and the intermediate film 230 is arranged so that the lines of the glass plate 210 are orthogonal to the lines of the glass plate 220. According to the above-described arrangement, the distortion, which becomes worse with the glass plate 210 only, will be reduced by the presence of the glass plate 220, in which the lines are orthogonal to the lines in the glass plate 210, and the intermediate film 230 that bonds the glass plate 210 and the glass plate 220, and the visibility is improved.

When the glass plates 210 and 220 are not wedge glass, in the glass plates 210 and 220, the lines are in a vertical direction with respect to the line of sight of the observer inside the vehicle interior (driver), and thereby the visibility does not degrade.

In order to prepare the intermediate film 230, for example, the above-described resin material, that comprises the intermediate film, is properly selected, and an extrusion molding is performed using an extruder in a heated and molten state. An extrusion condition, such as an extrusion rate of the extruder, is set to be uniform. Afterwards, the extrusion shaped resin film is extended as necessary in order to have curvatures on an upper side and a lower side so as to fit a shape of the front windshield 20, and thereby the intermediate film 230 is completed.

In order to prepare the laminated glass, the extended intermediate film 230 is held between the glass plate 210 and the glass plate 220 to form a laminated body. Then, the laminated body is placed into a rubber sack, and the bonding is performed under a vacuum of −65 to −100 kPa, and at temperature of about 70 to 110° C.

Furthermore, for example, by performing a pressure bonding process of heating and pressurizing under a condition of a temperature of 100 to 150° C., and a pressure of 0.6 to 1.3 MPa, a laminated glass that is more excellent in durability can be obtained. However, in some cases, taking into account simplification of processes, and characteristics of the material enclosed in the laminated glass, the heating and pressurizing process may not need to be used.

Between the glass plate 210 and the glass plate 220, in addition to the intermediate film 230, a film or a device having a function of a heating wire, infrared light reflection, a light emission, a power generation, dimming, visible light reflection, scattering, decoration, absorption or the like may be arranged.

Figure 5:
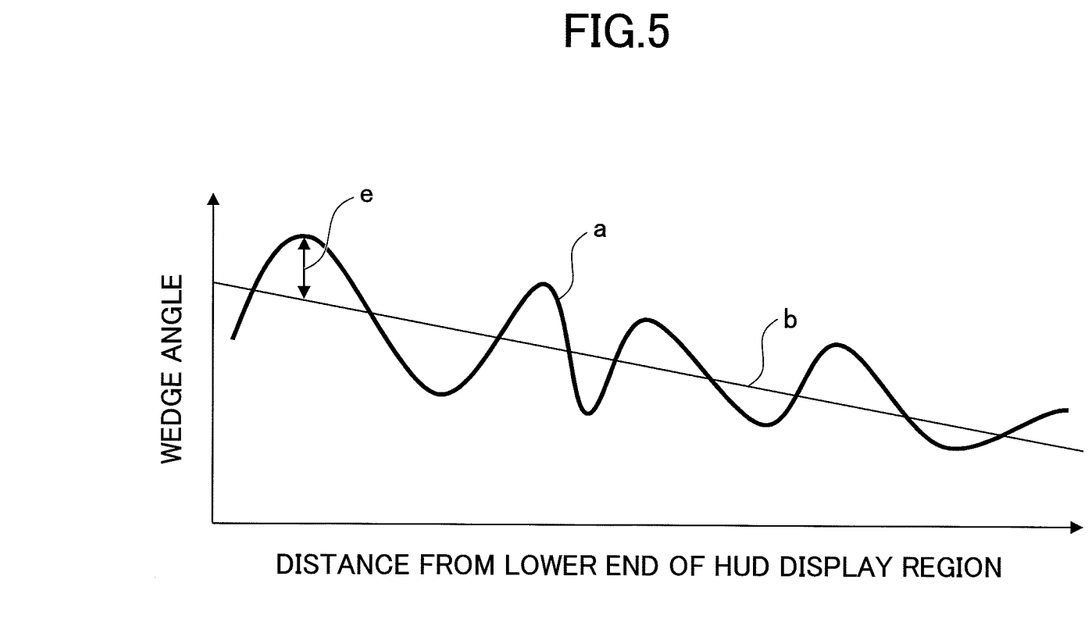
FIG. 5 is a diagram depicting an example of an amount of deviation in the wedge angle within the HUD display area.

FIG. 5 is a diagram depicting an example of deviation in the wedge angle in the HUD display area. The horizontal axis of FIG. 5 indicates the distance from a lower edge of the HUD display area A (in the Z-direction in FIGS. 2A and 2B). The vertical axis of FIG. 5 indicates the wedge angle. In FIG. 5, "a" indicates measured values of the wedge angles at respective positions in the vertical direction of the HUD display area A, and "b" indicates a linear approximate expression approximating the measured values of the wedge angles at the respective positions in the vertical direction of the HUD display area A by a linear function, obtained by using the least squares method. Moreover, "e" is the maximum amount of deviation of the measured values of the wedge angles "a" from the linear approximate expression "b". The maximum amount of deviation indicates the maximum amount among the amounts of deviations of the measured values of the wedge angle "a" from the linear approximate expression "b" within the HUD display area.

The inventors of the present application have found that in the HUD optical system, degrees of affecting to values of reflected double images by the maximum amount of deviation "e" shown in FIG. 5 when an FOV (Field Of View) in the vertical direction (Z-direction) is 2 degrees or more are different from those with the FOV of less than 2 degrees. The above-described property will be described with reference to results of simulation by the inventors of the present application, shown in TABLE 1.

TABLE 1

|  | Value of reflected double image | |
| --- | --- | --- |
| Maximum amount of deviation "e" | FOV is less than 2 degrees | FOV is 2 degrees or more |
| 0.25 mrad | 1.1 min | 2.2 min |
| 0.20 mrad | 0.6 min | 1.4 min |
| 0.15 mrad | 0.2 min | 0.7 min |

As shown in TABLE 1, in the case where the maximum amount of deviation "e" is 0.25 mrad, when the FOV is less than 2 degrees, the value of the reflected double image is 1.1 min. When the FOV is 2 degrees or more, the value of the reflected double image is 2.2 min, which is twice the value with the FOV less than 2 degrees. Moreover, in the case where the maximum amount of deviation "e" is 0.20 mrad, the value of the reflected double image with the FOV less than 2 degrees is 0.6 min, and the value of the reflected double image with the FOV of 2 degrees or more is 1.4 min, which is greater than twice the value with the FOV less than 2 degrees. Furthermore, in the case where the maximum amount of deviation "e" is 0.15 mrad, the value of the reflected double image with the FOV less than 2 degrees is 0.2 min, and the value of the reflected double image with the FOV of 2 degrees or more is 0.7 min, which is greater than three times the value with the FOV less than 2 degrees. The maximum amount of deviation "e" is more preferably 0.1 mrad or less, and further preferably 0.05 mrad or less.

In this way, regardless of the size of the FOV, as the maximum amount of deviation "e" increases, the value of the reflected double image increases. Thus, the maximum amount of deviation "e" is preferably small. Moreover, when the values of the reflected double images with the same value of the maximum amount of deviation "e" are compared, for any value of the maximum amount of deviation "e", the value of the reflected double image with the FOV of 2 degrees or more is greater than or equal to twice the value of the reflected double image with the FOV of less than 2 degrees. That is, a required reduction amount in the maximum amount of deviation "e" with the FOV of 2 degrees or more is greater than that in the maximum amount of deviation "e" with the FOV less than 2 degrees.

Typically, a driver having a visual acuity resolution of 0.7, the minimum required for a regular car license in Japan (ISO 8596: 2009), may notice a reflected double image with a change of 1.4 minutes. When the above-described property is applied to the relation shown in TABLE 1, it is found that the maximum amount of deviation "e" is required to be 0.2 mrad or less when the FOV is 2 degrees or more.

Moreover, the maximum amount of deviation "e" is more preferably 0.15 mrad or less when the FOV is 2 degrees or more. From TABLE 1, when the FOV is 2 degrees or more and the maximum amount of deviation "e" is 0.15 mrad, the value of the reflected double image is 0.7 minutes. The above-described value of the reflected double image is less than the resolution of a viewer having a visual acuity resolution of 1.0. Thus, the possibility of noticing by the viewer the reflected double image can be further reduced. From a viewpoint of enlarging the display area of the HUD, the FOV is preferably 2.5 degrees or more, further preferably 3 degrees or more, and especially preferably 4 degrees or more.

In order to limit the maximum amount of deviation "e", shown in FIG. 5, to 0.2 mrad or less, preferably 0.15 mrad or less when the FOV is 2 degrees or more, the manufacturing condition of the windshield 20 is required to be managed properly.

For example, in the windshield 20, when the intermediate film 230 is a wedge film, and the glass plates 210 and 220 are not formed to have wedge shapes, the heat temperature and the extrusion rate in the extrusion molding for the intermediate film 230 are required to be properly managed. Moreover, the heat temperature and the extension late in the extension process for the intermediate film 230 are required to be properly managed.

Moreover, in the windshield 20, when the intermediate film 230 is a wedge film, and either one of or both of the glass plate 210 and the glass plate 220 is formed to have a wedge shape, the line speed of floats and the temperature in the preparation of the glass plate 210 and the glass plate 220 are required to be properly managed. Moreover, the circumferential velocities of the plurality of rolls arranged on both ends of the glass ribbon moving on a melted metal are required to be properly controlled.

In the windshield 20, When the FOV of the HUD display area in the vertical direction is less than 2 degrees, the wedge angle of the intermediate film 230 is preferably changed within a range of 1.5 mrad or less. When the FOV is 2 degrees or more, the wedge angle of the intermediate film 230 is preferably changed within a range of 0.4 mrad or less. For the FOV of the HUD display area in the vertical direction that is 2 degrees or more, when the wedge angle of the intermediate film 230 becomes greater than 0.4 mrad, reflected double images become conspicuous. The wedge angle of the intermediate film 230 is more preferably 0.35 mrad or less, further preferably 0.30 mrad or less, especially preferably 0.25 mrad or less, especially preferably 0.20 mrad or less, and particularly preferably 0.10 mrad or less. Another effect of limiting the wedge angle of the intermediate film 230 to the above-described range, which is 0.4 mrad or less, is that the occurrence of a reflected double image is prevented even when the distance to the HUD image increases, such as 5 m, 7 m, 10 m, or 20 m, as the viewing angle of the HUD image increases.

Moreover, the linear approximation line for the wedge angle, as shown in FIG. 5, is preferably inclined in the direction so as to reduce the wedge angle, from the lower edge of the HUD display area in the vertical direction to the upper edge, i.e. the linear approximation line preferably has a negative inclination. According to the negative inclination of the linear approximation line, even when the HUD concave mirror is rotated in response to a vertical movement of the viewpoint of the driver, the occurrence of reflected double images are prevented compared with the related art.

A preferable profile of the wedge angle is to limit an absolute value of the inclination of the linear approximation line of the wedge angle shown in FIG. 5 to the range of 0.0006 mrad/mm or more and 0.006 mrad/mm or less. When the absolute value of the inclination of the linear approximation line for the wedge angle is greater than 0.0006 mrad/mm, according to a change in the wedge angle, the occurrence of reflected double images are effectively prevented. When the absolute value of the inclination of the linear approximation line for the wedge angle is less than 0.006 mrad/mm, when the glass follows a change in a shape, the shape does not change suddenly and thus the HUD display area is not distorted. The absolute value of the inclination of the linear approximation line for the wedge angle is more preferably 0.005 mrad/mm or less, further preferably 0.004 mrad/mm or less, especially preferably 0.003 mrad/mm or less, and particularly preferably 0.002 mrad/mm or less. Moreover, the absolute value of the inclination of the linear approximation line for the wedge angle is preferably 0.001 mrad/mm or more. Moreover, when the viewing angle in the vertical direction is less than 2.5 degrees, the inclination of the linear approximation line for the wedge angle is preferably negative. When the viewing angle in the vertical direction is 2.5 degrees or more, the inclination of the linear approximation line for the wedge angle is preferably positive.

By limiting the absolute value of the inclination of the linear approximation line to 0.0006 mrad/mm or more and 0.006 mrad/mm or less, when the HUD concave mirror is rotated in response to the vertical movement of the viewpoint of the driver, the value of the reflected double image is controlled so as to fall within an allowable range from −1.4 minutes to +1.4 minutes.

An absolute value of an inclination of the wedge angle, shown in FIG. 5, is preferably 0.006 mrad/mm or less, more preferably 0.005 mrad/mm or less, further preferably 0.004 mrad/mm or less, especially preferably 0.003 mrad/mm or less, and particularly preferably 0.002 mrad/mm or less. When the inclination of the linear approximation line, the maximum amount of deviation, and the absolute value of the inclination of the wedge angle fall within the ranges of the present invention, the distortion of the HUD display area is prevented.

The maximum amount of deviation e mrad and the viewing angle in the vertical direction FOV degrees preferably satisfy a relation (1) as follows. As the viewing angle for the HUD image increases, the reflected double image becomes conspicuous. However, when the maximum amount of deviation e and the viewing angle FOV satisfy the relation (1), the occurrence of a reflective double image is prevented even if the viewing angle for the HUD image is great.

$$e \leq -0.015 \times FOV + 0.23 \quad \text{formula (1)}$$

According to the present invention, in the laminated glass having a cross section with a non-constant wedge angle, the occurrence of a reflected double image is prevented even when the HUD display area is wider than that in the related art. In addition to the above feature, the wedge angle is designed by optimizing wedge angles using a linear approximation instead of a non-linear approximation, in the actual manufacturing intermediate films and laminated glasses can be stably produced.

As described above, the preferred embodiments and the like have been described in detail. However, the present invention is not limited to the above-described specific embodiments, and various variations and modifications may be made without deviating from the scope of the present invention.

REFERENCE SIGNS LIST

10, 40 light source
11a, 11b, 12a, 12b, 41a, 41b, 42a, 42b light beam
11c, 12c, 41c, 42c image
20 windshield
20D concave surface
21 vehicle interior
22 vehicle exterior
30 eyes
210, 220 glass plates
230 intermediate film
A, $A_1$, $A_2$ HUD display area
B non-HUD display area
δ wedge angle

What is claimed is:

1. A vehicle windshield comprising a laminated glass, the laminated glass comprising:
   a first glass plate which is to be arranged on a vehicle interior side;
   a second glass plate which is to be arranged on a vehicle exterior side; and
   an intermediate film located between the first glass plate and the second glass plate, and bonded to the first glass plate and to the second glass plate,
   wherein the laminated glass further comprises a display area used for a head-up display, the display area being a region on the vehicle windshield, which is irradiated with a light from a mirror configuring the head-up display viewed from a V1 point defined in JIS R3212, when the mirror is rotated,
   wherein the display area includes an area having a cross section with a wedge shape, a thickness of an upper edge side portion of the display area in a vertical direction being greater than a thickness of a lower edge side portion of the display area,
   wherein at least a part of a region of the display area has a cross section with a wedge shape,
   wherein when a local wedge angle of the laminated glass at a certain point in the display area is measured by (1) measuring thirteen thicknesses at thirteen points of the laminated glass each of which has 5 mm interval and which is positioned within a range of 30 mm from the certain point along a vertical direction when the laminated glass is mounted to a vehicle, and (2) calculating an average variation rate of the thirteen thicknesses using the least square method to obtain the local wedge angle at the certain point, each of the local wedge angles in the display area varies depending on a position of measurement in the vertical direction,
   wherein a maximum amount of deviation in each of the local wedge angles of the laminated glass in the display area from a linear approximation line obtained by approximating the local wedge angles of the laminated glass in the display area in the vertical direction is 0.2 mrad or less,
   wherein the linear approximation line has a positive inclination, in accordance with the vertical direction from the lower edge side portion to the upper edge side portion of the display area,
   wherein an absolute value of the positive inclination of the linear approximation line is 0.0006 mrad/mm or more and 0.006 mrad/mm or less, and
   wherein an average wedge angle of the intermediate film is 0.4 mrad or less.

2. The vehicle windshield according to claim 1, wherein the maximum amount of deviation is 0.15 mrad or less.

3. The vehicle windshield according to claim 1, wherein the absolute value of the positive inclination of the linear approximation line is 0.005 mrad/mm or less.

4. The vehicle windshield according to claim 1, wherein the absolute value of the positive inclination of the linear approximation line is 0.001 mrad/mm or more.

5. The vehicle windshield according to claim 1, wherein the absolute value of the positive inclination of the linear approximation line is 0.004 mrad/mm or less.

6. The vehicle windshield according to claim 1, wherein a radius of curvature of a concave face of the laminated glass is 6000 mm or more.

7. The vehicle windshield according to claim 1,
wherein the average wedge angle of the intermediate film is 0.12 mrad or less.

8. The vehicle windshield according to claim 1,
wherein the average wedge angle of the intermediate film is 0.10 mrad or less.

9. The vehicle windshield according to claim 7,
wherein the absolute value of the positive inclination of the linear approximation line is 0.001 mrad/mm or more.

10. The vehicle windshield according to claim 7,
wherein the absolute value of the positive inclination of the linear approximation line is 0.001 mrad/mm or more and 0.003 mrad/mm or less.

11. The vehicle windshield according to claim 7, wherein the absolute value of the positive inclination of the linear approximation line is 0.001 mrad/mm or more and 0.002 mrad/mm or less.

12. A vehicle windshield comprising a laminated glass, the laminated glass comprising:
a first glass plate which is to be arranged on a vehicle interior side;
a second glass plate which is to be arranged on a vehicle exterior side; and
an intermediate film located between the first glass plate and the second glass plate, and bonded to the first glass plate and to the second glass plate,
wherein the laminated glass further comprises a display area used for a head-up display, the display area being a region on the vehicle windshield, which is irradiated with a light from a mirror configuring the head-up display viewed from a V1 point defined in JIS R3212, when the mirror is rotated,
wherein the display area includes an area having a cross section with a wedge shape, a thickness of an upper edge side portion of the display area in a vertical direction being greater than a thickness of a lower edge side portion of the display area,
wherein at least a part of a region of the display area has a cross section with a wedge shape,
wherein when a local wedge angle of the laminated glass at a certain point in the display area is measured by (1) measuring thirteen thicknesses at thirteen points of the laminated glass each of which has 5 mm interval and which is positioned within a range of 30 mm from the certain point along a vertical direction when the laminated glass is mounted to a vehicle, and (2) calculating an average variation rate of the thirteen thicknesses using the least square method to obtain the local wedge angle at the certain point, each of the local wedge angles in the display area varies depending on a position of measurement in the vertical direction,
wherein a maximum amount of deviation in each of the local wedge angles of the laminated glass in the display area from a linear approximation line obtained by approximating the local wedge angles of the laminated glass in the display area in the vertical direction is 0.2 mrad or less,
wherein the linear approximation line has a positive inclination, in accordance with the vertical direction from the lower edge side portion to the upper edge side portion of the display area, and
wherein an absolute value of the positive inclination of the linear approximation line is 0.001 mrad/mm or more and 0.006 mrad/mm or less.

13. The vehicle windshield according to claim 12,
wherein the maximum amount of deviation is 0.15 mrad or less.

14. The vehicle windshield according to claim 12,
wherein the absolute value of the positive inclination of the linear approximation line is 0.005 mrad/mm or less.

15. The vehicle windshield according to claim 12,
wherein the absolute value of the positive inclination of the linear approximation line is 0.004 mrad/mm or less.

16. The vehicle windshield according to claim 12,
wherein a radius of curvature of a concave face of the laminated glass is 6000 mm or more.

17. The vehicle windshield according to claim 12,
wherein an average wedge angle of the intermediate film is 0.12 mrad or less.

18. The vehicle windshield according to claim 12,
wherein an average wedge angle of the intermediate film is 0.10 mrad or less.

19. The vehicle windshield according to claim 17,
wherein the absolute value of the positive inclination of the linear approximation line is 0.001 mrad/mm or more and 0.003 mrad/mm or less.

20. The vehicle windshield according to claim 17,
wherein the absolute value of the positive inclination of the linear approximation line is 0.001 mrad/mm or more and 0.002 mrad/mm or less.

* * * * *